United States Patent [19]

Detrick

[11] Patent Number: 4,893,229

[45] Date of Patent: Jan. 9, 1990

[54] COMPUTERIZED CAR WASH CONTROLLER SYSTEM

[75] Inventor: Kevin Detrick, Stroudsburg, Pa.

[73] Assignee: Innovative Control Systems, Inc., Allentown, Pa.

[21] Appl. No.: 242,725

[22] Filed: Sep. 9, 1988

[51] Int. Cl.$^4$ .......................... G05B 19/00; B08B 3/00
[52] U.S. Cl. ................................. 364/140; 15/316 R; 15/DIG. 2; 34/243 C; 134/123
[58] Field of Search ............. 364/140; 15/316 R, 319, 15/DIG. 2; 34/243 C; 134/123; 198/339.1, 340, 341

[56] References Cited

U.S. PATENT DOCUMENTS

| | | | |
|---|---|---|---|
| 3,809,919 | 5/1974 | Aaron | 307/41 |
| 3,823,356 | 7/1974 | Paavola et al. | 318/39 |
| 3,828,317 | 8/1974 | Mette | 235/150 |
| 3,854,054 | 12/1974 | Conn, Jr. | 307/41 |
| 4,092,759 | 6/1978 | Weigele | 15/257 |
| 4,293,914 | 10/1981 | Van Trang | 364/900 |
| 4,305,174 | 12/1981 | Pyle et al. | 15/53 A |
| 4,503,503 | 3/1985 | Suzuki | 364/405 |
| 4,527,578 | 7/1985 | Klein et al. | 134/57 R |
| 4,589,069 | 5/1986 | Endo et al. | 364/405 |
| 4,719,932 | 1/1988 | Burton | 134/123 |

Primary Examiner—Allen MacDonald
Attorney, Agent, or Firm—Steele, Gould & Fried

[57] ABSTRACT

The computerized car wash controls a plurality of washing and waxing devices for cars. These devices are controlled by command signals and the cars are moved through the devices via a conveyor. The system includes a car tracking scheme that monitors the position of the cars as they move by the plurality of car washing and waxing devices. The system also includes an input device at which the car wash operator selects certain car washing and waxing options as ordered by the car owner. The system includes a device for generating command signals for each of the plurality of car washing and waxing devices. The command signal generator generates these signals based upon (1) the selections obtained by the car wash operator at the input device; (2) a pre-established baseline operational sequence for the plurality of car washing and waxing devices; and (3) the positions of the cars that are determined by the car tracker. The system includes a monitoring device that determines when more than a single car has been tracked by the tracker based upon the selections of the car wash operator for each car. The system also includes a device for monitoring the length of each car and when that length exceeds a predetermined value, generating a violation signal, and a device for summing the total time (expressed in incremental units of the movement of the conveyor) the violation signal is present.

20 Claims, 3 Drawing Sheets

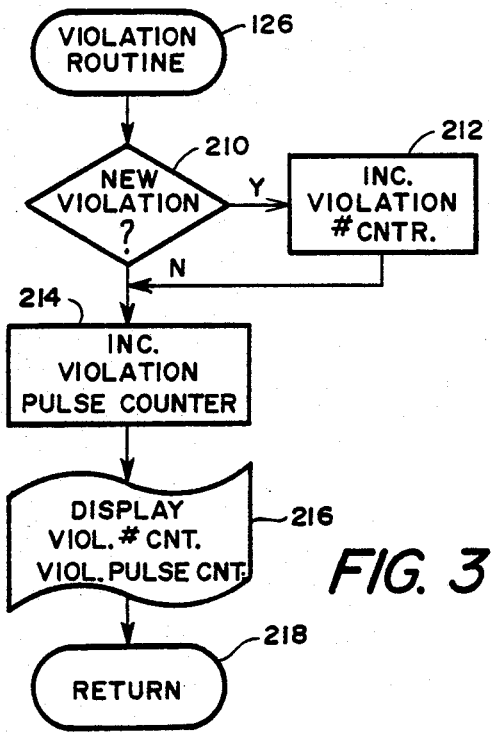
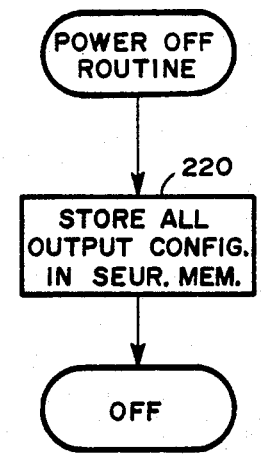
FIG. 3
FIG. 4
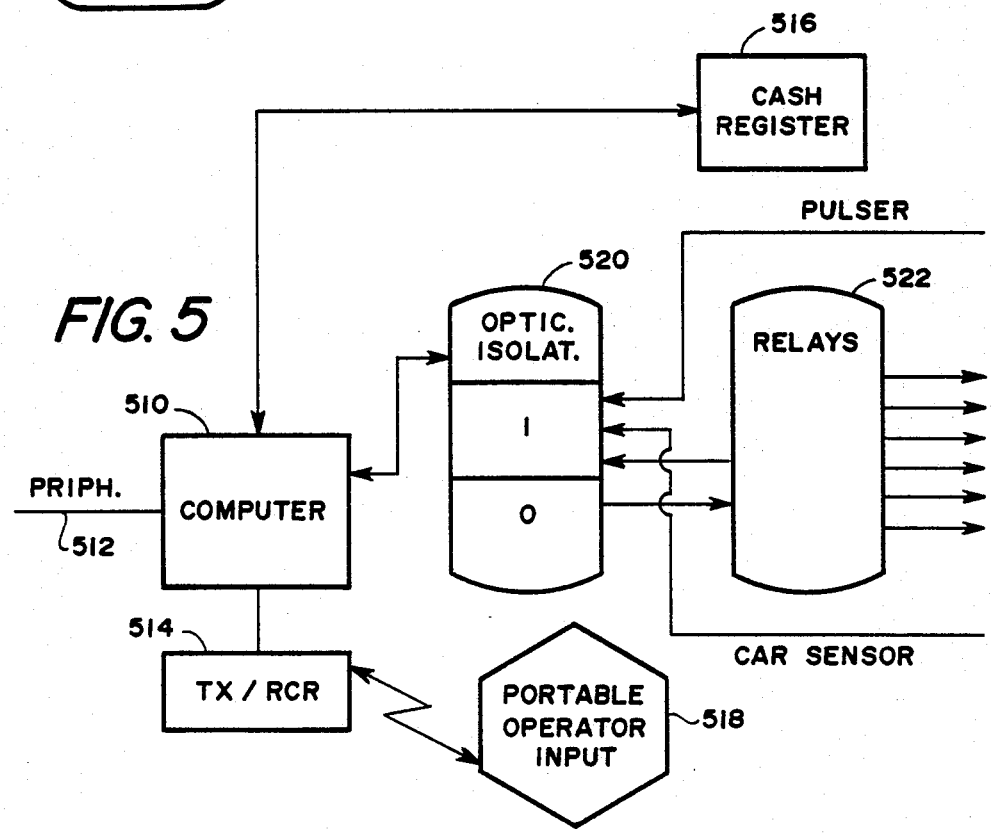
FIG. 5

COMPUTERIZED CAR WASH CONTROLLER SYSTEM

BACKGROUND OF THE INVENTION

The present invention relates to a computerized system for controlling car wash devices.

U.S. Pat. No. 3,854,054 to Conn, Jr. discloses a car wash apparatus which utilized a plurality of photo cells at the beginning of the conveyor for the car wash. The photo cells sense the total length of the car. The output of the photo cells is coupled to a logic circuit that actuates the car washing and waxing devices downstream on the conveyor line. The logic circuit also receives an input from an encoder that senses the movement of the conveyor. Another prior art device monitors the amount of time, based on the conveyor encoder, the photocells or car sensor(s) are activated to determine when the car wash operators are blocking the sensors and causing more than a single car to enter the wash assembly line. U.S. Pat. No. 4,527,578 to Klein et al. discloses an automatic vehicle washer having an input device that accepts a coded input, a comparison circuit that compares the coded signal to a predetermined set of codes, and an actuator that activates the car wash and waxing devices upon a match between the coded signal and the stored set of codes.

U.S. Pat. No. 4,589,069 to Endo et al. discloses a data input and output system for a gas station. This system includes an input device for selecting a quantity of gas and a certain dispensing unit for the gas, a display and a computation unit for generating sales and management data.

U.S. Pat. No. 4,503,503 to Suzuki discloses a transaction processing apparatus that produces data on commodities sold. Particularly, the Suzuki apparatus acts on an electronic cash register.

U.S. Pat. No. 4,092,759 to Weigele discloses a counting mechanism for a car wash. The counting mechanism is mounted at the beginning of the car wash conveyor.

U.S. Pat. No. 4,305,174 to Pyle et al. discloses a control system for a car wash. That system senses the position of the car and sequentially actuates front and rear rollers for cleaning the car passing through the car wash device.

U.S. Pat. No. 3,809,919 to Aaron discloses a control system for a car wash which system includes a plurality of sensors distributed along the length of the conveyor that carries the car. U.S. Pat. No. 3,823,356 to Paavola et al. discloses a car washing device. U.S. Pat. No. 3,828,317 to Mette discloses a process sequence controller for a car wash. The controller does not sense the position of the car on the conveyor. U.S. Pat. No. 4,293,914 to Van Trang discloses an automatic control system for car washes which utilizes relay operated switches and times to control sequences operation of the car washing and waxing devices.

The problems of the prior art automated car washing and waxing systems include (1) the inability of the systems to monitor the number of times and the duration the car wash operators block or alter the input sensors in order to "cheat" the system and wash and wax cars without the system accounting for those cars; (2) the inability of those systems to detect when the operators override control signals to specific car washing or car waxing devices, that is to selectively activate certain devices, e.g., wax applicators, for a particular car other than that ordered and paid for; (3) the inability of the prior art systems to keep complete records on all the cars passing through the car wash; and (4) the general inability of the prior art devices to provide easy management or data processing outputs for the car wash owners.

OBJECTS OF THE INVENTION

It is an object of the present invention to provide a car wash controller that utilizes a multipurpose computer such as a personal computer.

It is another object of the present invention to provide a computerized car wash controller that substantially eliminates theft of services by the car wash operators.

It is a further object of the present invention to provide a car wash controller that includes manual override switches with non-resetable counters in order to ensure that the override switches are not activated without accounting for such override.

It is an additional object of the present invention to include a car wash controller having a non-retrievable storage mechanism such that the accountability data accumulated by the system cannot be altered by car wash operators.

It is an additional object of the present invention to provide a car wash controller utilizing a multi-purpose computer and an electrical isolator mechanism such that the computer is protected from electrical problems that may occur in the control and operation of the car washing and waxing devices.

It is a further object of the present invention to provide a car wash controller system with a personal computer that produces information, custom-made reports and management reports. The computer's output can be easily configured for many types of input/output such as a cash register tie-in or telecommunications capability.

BRIEF DESCRIPTION OF THE DRAWINGS

Further objects and advantages of the present invention can be found in the detailed description of the preferred embodiments when taken in conjunction with the accompanying drawings in which:

FIG. 3 illustrates the violation sub-routine program;

FIG. 4 illustrates the power off routine;

FIG. 5 illustrates a second embodiment of the present invention utilizing a telecommunications link; and FIG. 6 illustrates an input device for the present invention.

SUMMARY OF THE INVENTION

The computerized car wash controls a plurality of washing and waxing devices for cars. These devices are controlled by command signals and the cars are moved through the devices via a conveyor. The system includes a car tracking scheme that monitors the position of the cars as they move by the plurality of car washing and waxing devices. The system also includes an input device at which the car wash operator selects certain car washing and waxing options as ordered by the car owner. The system includes a device for generating command signals for each of the plurality of car washing and waxing devices. The command signal generator generates these signals based upon (1) the selections obtained by the car wash operator at the input device; (2) a pre-established baseline operational sequence for the plurality of car washing and waxing devices; and (3) the positions of the cars that are determined by the car tracker. The system includes a monitoring device that determines when more than a single car has been tracked by the tracker based upon the selections of the car wash operator for each car. The system also includes a device for monitoring the length of each car and when that length exceeds a predetermined value, generating a violation signal, and a device for summing the total time (expressed in incremental units of the movement of the conveyor) the violation signal is present.

DETAILED DESCRIPTION OF THE PREFERRED EMBODIMENT

The present invention relates a computerized car wash controller system.

Figure 1:
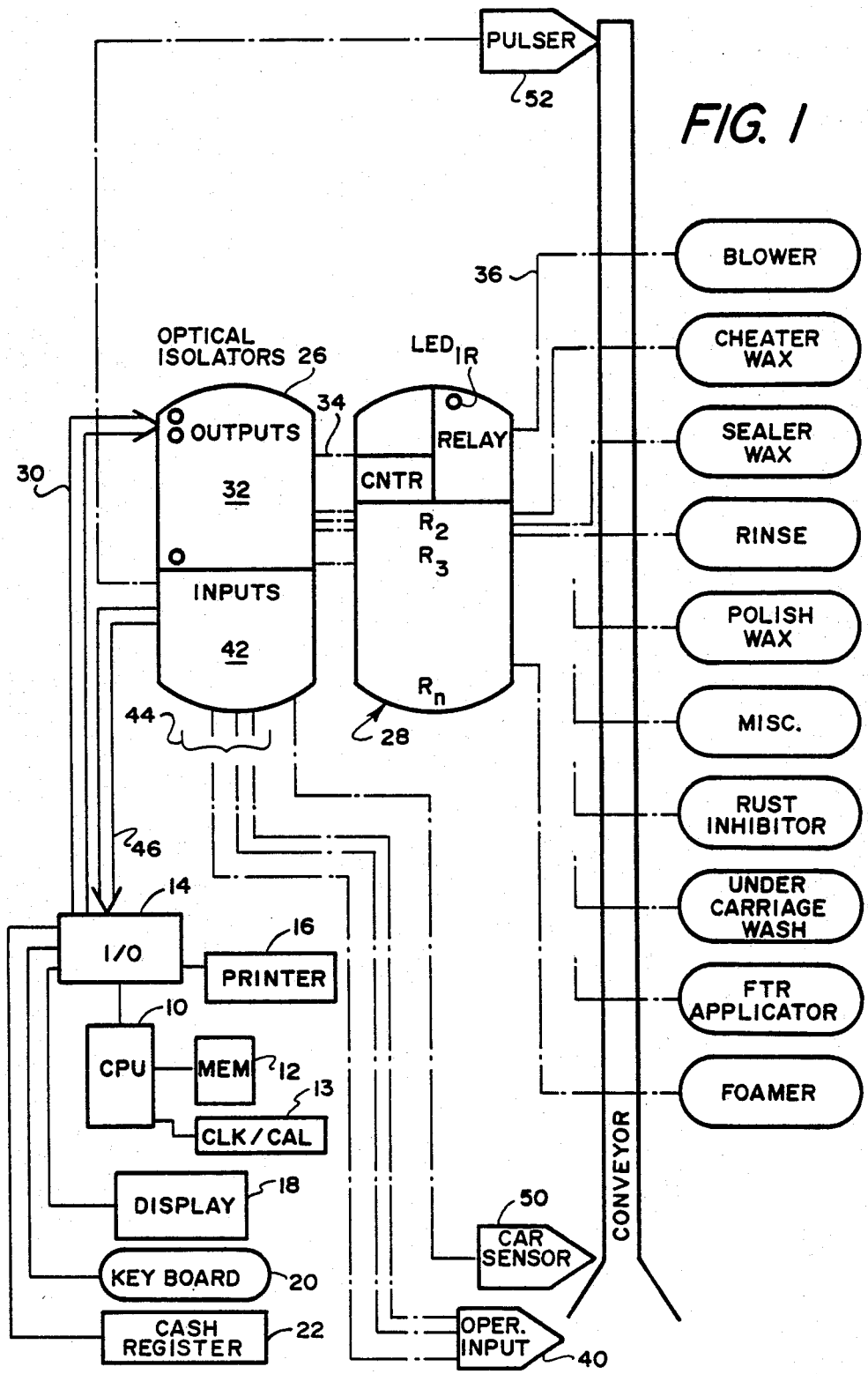
FIG. 1 illustrates, in block diagram form, the computerized car wash controller system of the present invention.

FIG. 1 illustrates, in block diagram form, the car wash controller system. The system can be generally broken down into three sub-systems, the multi-purpose computer or data processing section and its peripherals; the interface between the computer and the car washing and waxing devices and other sensors; and the car washing and waxing devices themselves along with various sensors and an operator input device.

The multi-purpose computer consists of a central processing unit, CPU 10, a memory unit 12 and a clock/calendar device 13. As is known to persons of ordinary skill in the art, personal computers, herein called "multi-purpose computers", are readily available on the market and include central processing units, memories, such as random access memories (RAM) and read only memories (ROM), as well as devices that track the hour of the day (clocks) and day, month and year (calendars). CPU 10 receives and sends digitally formatted signals to the other peripheral devices via an input/output device 14. A printer 16, a display 18 (such as a video or CRT display), a keyboard 20 and a cash register type device 22 are connected to the input/output device. The operation and interaction of all these devices is known to persons or ordinary skill in the art.

The interface between the data processing devices and peripherals and the car washing and waxing devices consists of input/output electrical isolators. These include a plurality of optical isolators 26 and a plurality of relay devices 28. Optical isolators 26 may be quad I/O module boards, model PB32Q (PB32 DEC) manufactured by Gordos Arkansas, Inc., of Rogers, Ark. These isolators may also include model PB16 made by Gordos Arkansas. In other embodiments, the isolators could be multiplexed optical isolators. Optical isolators 26 include output isolators 32 and input isolators 42.

Basically, digital signals are placed upon digital bus 30 leading to output isolators 32. Each output isolator includes an LED ($LED_{1O}$). By utilizing optical isolators with an LED, the car wash operator can immediately determine if the data processing system (e.g., CPU 10) is generating the correct output signal to activate a particular car washing or waxing device and is receiving the correct input signals. The digital signal on bus 30 is electrically isolated by the optical isolator 26 and a signal, typically having a different voltage level, is applied to one of the plurality of output lines collectively designated as lines 34 in FIG. 1. The signals on lines 34 are generally high or low electrical signals. These signals are sent to relay unit 28. Relay unit 28 includes a plurality of distinct relays (e.g., $relay_1$) for each particular car washing or waxing device. Each relay also includes an LED ($LED_{1R}$) as well as a manual switch override ($SW_{ml}$) and a clock counter ($CNTR$). The output of $relay_1$ is typically a 24 volt signal that is applied to one of the car washing or waxing devices. In this particular case, $relay_1$ applies an electrical command signal via control line 36 to a blower on the car wash "assembly" line. The clock counter associated with $relay_1$ is activated each time manual override switch $SW_1$ is activated and measures the amount of time the override switches are activated. Accordingly, each counter has its own internal clocking device that is powered by the voltage at the relay. The clock counter is non-resetable such that the car wash operator cannot actuate the manual switch without the counter being incremented. This insures that the car wash operator cannot steal car washing and waxing services by simply overriding one of the software generated controls.

As an example, the car wash includes a conveyor that carries the car through the following washing and waxing devices; foamer, FTR applicator, under-carriage wash, rust inhibitor, polish wax, rinse, sealer wax, cheater wax, and blower. Of course, each car wash may have these or other devices in a different sequence or may omit some of these devices. Also, each device may have several independent control inputs that activate different portions of the device. The multi-purpose computer can be programmed to control an extremely wide variety of car wash lines since it is extremely flexible due to its programming. capabilities. As shown in FIG. 1, each car washing or waxing device is associated with a separate relay $R_1$ through $R_n$. These relays are principally controlled by optical isolator outputs 32.

The system also includes several input devices. An operator input 40 enables the car wash operator to select certain washing or waxing devices based upon instructions from the car owner. Table 1 that follows shows a typical operator input.

TABLE 1

| |
|---|
| Undercarriage wash |
| Rust Inhibitor |
| Polish and Wax |
| Sealer Wax |
| Equipment Retract |
| - tire cleaner |
| - Top Washer |
| - Side Arms |
| - ALL |
| Wheel Bright |
| Standard |
| Deluxe |
| Super |
| RESET |

For each car, the car wash operator would select a particular input. For a standard wash, the operator selects the standard input. The standard input is the default value and requires no further input by the operator. Optical isolator bank 26 includes input isolators 42 that electrically separate the input selections from the data processing section that includes CPU 10. Input isolators 42 convert the signal coming from signal bus 44 into a digitally formatted signal and place that digitally formatted signal onto bus 46. Periodically, CPU 10 sweeps all the ports in the input/output device 14 and any changed signal on the port is noted and handled appropriately by the data processing system.

The system also includes a car wash sensor 50 that senses the presence of a car and generates a CAR PRESENT signal. The car sensor can be a mechanical switch that is activated by the car, can be a photo cell that is activated by a portion of the car, or a magnetic metal sensor. In any event, the car sensor 50 generates a CAR PRESENT signal that is converted by input isolators 42 and applied to signal bus 46 such that the signal can be sensed by the data processing system.

Pulser 52 monitors the movement of the conveyor. By monitoring the car when it is initially captured by the conveyor and monitoring the movement of the conveyor by pulser 52, the data processing system tracks the car as it passes by the car washing and waxing devices. Pulser 52 can be an encoder or any type of monitoring mechanism that would produce a signal dependent upon the movement of the car through the car wash line.

Figure 2:
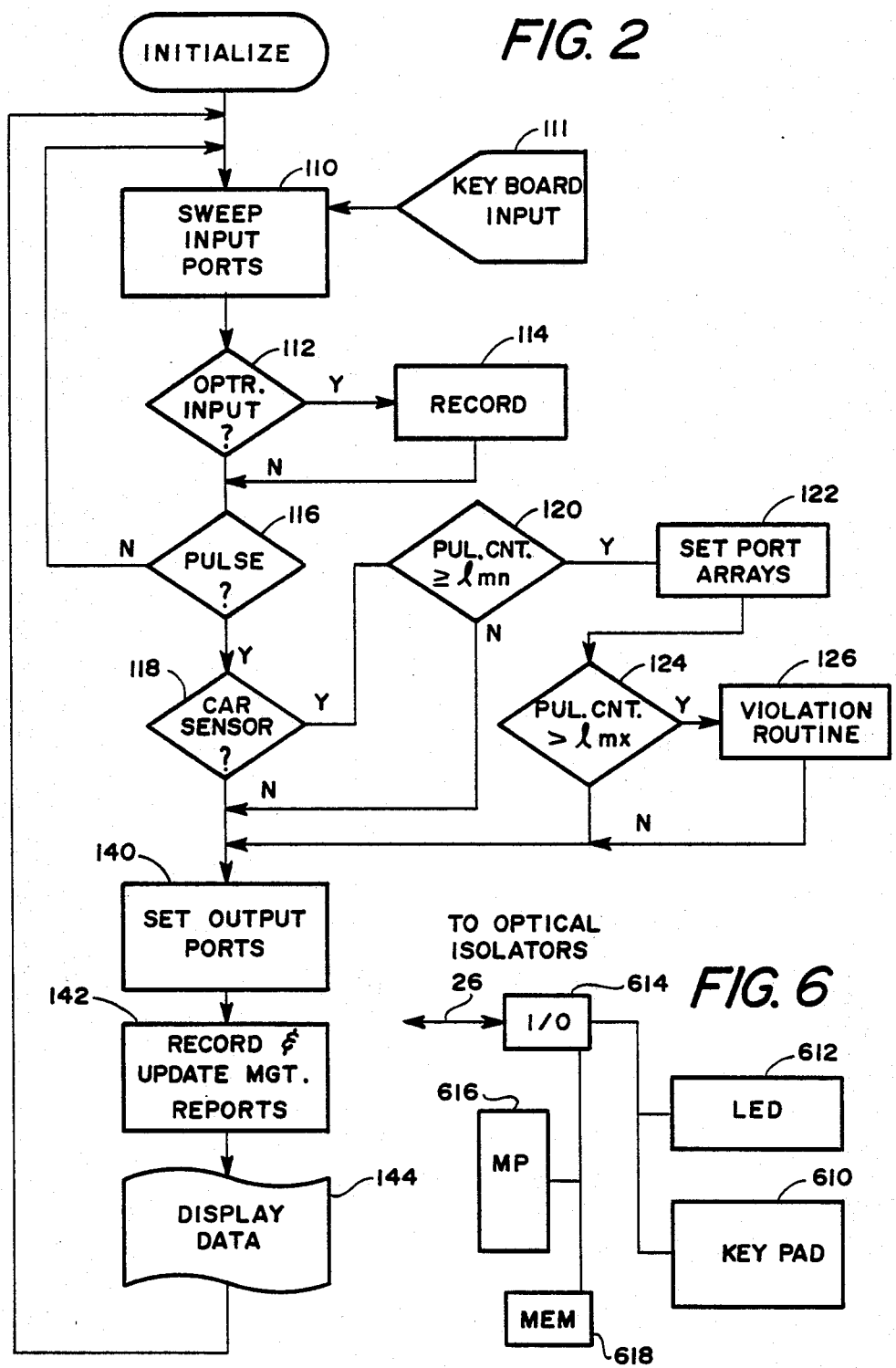
FIG. 2 illustrates, in flow chart form, the principal operating sequence of the computer controlling the car washing and waxing devices.

FIG. 2 illustrates, in flow chart form, the general configuration of the program executed by CPU 10. The first step is that CPU 10 is initialized. Dependent upon the internal operating cycle of CPU 10, all the input ports are periodically swept in step 110. The sweeping of the input ports is the monitoring of signal bus 46 by input/output device 14 in CPU 10. Also, this step reads input from keyboard 111. Step 112 determines whether an operator input has been selected. If an input has been selected, that input is stored, in step 114, as an initial record in memory 12. If no operator input has been selected in step 112, a determination is made whether pulser 52 has been activated in step 116. If not, the program returns to step 110. If a pulse has been sensed, step 118 determines whether car sensor 50 has been activated. If a car is detected based upon a CAR PRESENT signal, step 120 determines whether the pulse count is greater than or equal to the minimum car length ($1_{mn}$). Implicit in step 118 is the counting of the number of pluses from pulser 52 during the time that the CAR PRESENT signal is present on the input port. This count is called a "car pulse count". If the car pulse count is not greater than the minimum car length $1_{mn}$, CPU 10 executes step 140 by setting the output ports, therefore ignoring the car which is currently being sensed when the car length value is less than $1_{mn}$.

A pre-established baseline operational sequence for each of the car washing and waxing devices is stored in memory 12. In other words, there is a minimum sequence that each car must have. For example, any car going through the car wash line must have the foamer, rinse and blower activated. CPU 10 and memory 12 have the capability of tracking the car's position based upon the inputs from the car sensor and the pulser such that the foamer is activated when the car is adjacent the foamer, the rinse is activated when the car is adjacent thereto and the blower is subsequently activated accordingly. In this sense, the memory must include a pre-established baseline operational sequence for the car washing and waxing devices. The baseline sequence is programmed into the computer as is the minimum car length $1_{mn}$.

In one embodiment, the program utilized an input configuration file. Table 2 below lists the input configuration file. PB represents a push button of the operator input. Therefore, PB1 may correspond to undercarriage wash listed above in Table 1. The output 010 and 012 is associated with PB1. This means that when push button 1 is activated, CPU 10 must activate output 10 and output 12 at the appropriate time, based upon the tracking of the car through the car wash line. The file also includes a cost or price for each input PB.

TABLE 2

INPUT CONFIGURATION FILE

| Input | Output | Cost |
|-------|--------|------|
| PB1 | 010, 012 | $ |
| PB2 | 013 | $ |
| PB3 | 014, 020 | $ |
| PB4 | 06 | $ |
| . | | |
| . | | |
| . | | |
| PBn | On | $ |

The program creates a unique output configuration file that is based upon the input configuration file, a look-up output file and the selections made by the car wash operator. The look-up output file is created by the car wash owner through the computer software set-up program. The look-up output file lists every car wash/car wax device on the line and its respective output designator. It lists whether the device is mandatory, selective or deselective output, the distance on the line, in a pulse count value, from the car sensor and the length of the device, as a pulse count extension. The unique output configuration file is created by the program by comparing the temporary input file based upon the operator's selections with the look-up output file. The match between the input and look-up files results in the unique output configuration file for the car. Table 3 that follows is a sample output configuration file.

TABLE 3

| Sample Output Configuration File | | | |
|---|---|---|---|
| Pre-Final Rinse | M | 14 | 2 | 0.00 |
| Cheater Wax | D | 18 | 2 | 0.00 |
| Sealer | S | 18 | 2 | 1.50 |
| Undercarriage | S | 23 | 2 | 1.00 |
| Polisher | S | 27 | 2 | 1.00 |
| Blower | M | 35 | 4 | 0.00 |

The output configuration file includes identifiers for certain car washing or waxing devices. For example, the pre-final rinse is such a device. The next information in the file is the type of output that is associated with a device. Type M is a mandatory output. Type D is a de-selected output and type S is a selected output. Mandatory outputs drive devices that are actuated for each car carried by the conveyor through the car wash line. These outputs are always set TRUE. Type D outputs relate to devices that are de-selected by the operator unit. For example, there may be devices on the car wash line that rub or brush certain portions of a car such as a tire cleaner. The car owner may not want that rubbing or brushing for his/her car. The car wash operator would then select the tire cleaner retract input (see Table 1 above), that is de-select the device, and therefore that device would not rub or brush against the tires of the car. In that sense, the output is de-selected by the input variable. These outputs are normally TRUE, signifying an inclusion in the sequence, but can be switched FALSE, i.e., de-select, based upon the input. Type S outputs relate to additional options requested by the car wash operator. For example, if the car owner wishes a sealer wax, the operator selects the sealer wax input, and the resulting output file shows S for the sealer wax. The input configuration file is converted into a unique output configuration file via a scratch pad or RAM memory for that particular car.

The next information in the output configuration file represents the number of pulses from the car sensor at which that particular output must be activated to start a particular device. In this embodiment, each pulse represents about two feet on the car wash line. The pre-final rinse is 14 pulses from the sensor. The next number represents the number of pulses during which time the output must remain ON because of the length of the car wash/car wax device on the car wash line. This is the pulse extension. The pre-final rinse stays ON for the length of the car plus two pulses. The final column represents the charges for cost of that particular output. For example, the sealer wax charge to the car owner is $1.50.

Returning to FIG. 2, step 140 sets the output ports dependent upon the particular output configuration files. If the pulse counter in step 120 has not exceeded the minimum car length $1_{mn}$, the output configuration file has not been completed for the car that has just been sensed by car sensor 50.

Step 142 records what particular output ports have changed state from the last cycle through this segment of the program and updates the management reports. For example, if the sealer output was activated, a record is maintained noting the number of times the sealer output was activated and also the dollar increment for that output. Step 144 displays the data on display 18. Table 4 that follows is a typical screen display.

TABLE 4

| Screen Display | | | |
|---|---|---|---|
| # Cars Washed | | Current Time | |
| # Violations/Violation CNTR [2/25 ] | | Car Sensor ON | |
| Sealer Select # * | | Pre-Final Rinse | # * |
| Under Select # | | Cheater Wax | # |
| Polish Select # | | Sealer | # * |
| Dazzle # | | Blower | # |
| Avg Sales/Car $ | | | |
| Cars/Man-Hr. # | | | |
| Cars this Hour # | | | |

The screen display shows the number of cars washed, the number of violations and the total length of the violations (that will be explained later), the current time, and the status of car sensor 50 (ON/OFF). When the display signals sensor ON a car is at the beginning of the car wash line. The display also shows the number of times each of the money generating car wash outputs have been activated, thereby giving an indication of the profitability on a daily basis of that car wash to the car wash owner. An asterisk by that output signifies that the output is currently being activated. Therefore, the asterisk near the sealer output indicates that a car is currently being waxed by that device on the car wash line. The display also includes an average sales per car dollar value, the cars per man hour ratio and the number of cars that have been processed by the car wash this hour. The cars per man hour ratio is based upon inputs received from keyboard input 111, such as the number of employees currently working at the car wash.

Returning back to step 120 and the determination whether the car pulse counter is greater than the minimum car length $1_{mn}$, if the total number of pulses is greater than $1_{mn}$, CPU 10 executes step 122 by setting the port arrays. The setting of the port arrays is generally based upon the completion of an output configuration file. In the present system, CPU 10 and memory 12 monitor the total number of pulses generated by pulser 52 on a daily basis. Therefore, the total pulse count (TPC) continues to get larger and larger as the day progresses. TPCs in the neighborhood of 40K are not unusual. After an output configuration file has been completed, CPU 10 obtains the TPC, adds the number of pulses from the car sensor to the particular output device to the TPC and places the resulting number (ON pulse number) into an output array unique to that particular device. The computer also obtains the pulse extension (for the length of the car) from the output configuration file adds that to the ON pulse number and stores the resulting pulse number as an OFF signal (pulse number) in the output array. When the computer reaches step 140, all the output arrays are read and the outputs are set to the correct state based upon each output array. Each array is a stacked list.

After the port arrays are set and the output configuration is established, CPU 10 executes step 124 that determines whether the car pulse count is larger than the maximum car length $1_{mx}$. If the car pulse count is not greater, the program returns to step 140. If it is greater than the maximum length, the computer will execute the violation routines as step 126.

Another integral step in step 118 is when the CAR PRESENT signal is no longer sensed by the computer, the car pulse counter is reset to zero and other initializations occur such as the clearing of the temporary output configuration file.

Table 5 below shows a daily printout that is available to the car wash owner upon activation of certain keyboard inputs in step 111.

TABLE 5

| Daily Print Out |
|---|
| DATE, START TIME, STOP TIME |
| TOTAL SALES $ |
| TOTAL WASHES |
| # TIMES OUTPUT ACTIVATED, TOTAL SALES PER OUTPUT |
| METERED RECEIPTS |

The daily output printout could be obtained via printer 16 or may be visually displayed by display 18, upon the proper commands. The printout includes the date, the time the car wash line started, the time the car wash line stopped, the total sales for that day and the total number of washes. The printout also includes the number of times each output was activated, the total sales per output, and metered receipts. Metered receipts may be coupons or discounts that were given to the car owners. These metered receipts would be input via keyboard input 111 and the program would alter the data appropriately. Other financial analysis of this data could be programmed into the computer without significant difficulty.

FIG. 3 illustrates, in flow chart form, the violation routine. Based upon a study of thefts by car wash operators, it has been determined that the operator usually blocks or alters the sensing capabilities of the car sensors such that one or more cars may pass through the car wash line without being individually monitored. Therefore, the controller would only have the pulse count TPC to start each car washing and waxing device. In other words, the output arrays would only include an ON pulse signal. The car wash operator could run two or three cars "bumper to bumper" through the car wash line, thereby stealing goods and services from the car wash owner. The present routine is meant to monitor such activity. Step 210 determines whether this is a new violation. If it is, the step 212 increments a violation number counter. In any event, step 214 is activated next, which increments the violation pulse counter. The violation pulse counter is the total number of pulses for all violations that have occurred that date. The violation number counter is the number of violations that have occurred. Therefore, if a dishonest car wash operator blocks the car sensor once and lets five cars pass through, the violation number counter would indicate one but the violation pulse counter would indicate, for example, 120. Step 216 displays the violation number count and violation pulse count on the display screen. See Table 4 above. Step 218 returns to the main program shown in FIG. 2.

FIG. 4 illustrates the POWER OFF routine. This routine is run any time that power is disrupted to the computer. The computer may have a small backup power supply such that the POWER OFF routine is executed when power is removed from the system. If the computer was manually switched off, the POWER OFF routine is activated. Step 220 of the POWER OFF routine stores all output configuration files in a secure memory. This secure memory is a write once read only memory. Therefore, the car wash operator cannot alter the contents of this memory.

FIG. 5 illustrates another embodiment of the present invention. Computer 510 is connected to peripherals 512 and transmitter/receiver unit 514. Cash register 516 is directly coupled to the computer. The transmitter/receiver unit communicates via a telecommunications link to a portable operator input device 518. Many types of telecommunications can be utilized. This feature enables the computer to be remotely disposed and not be "hard wired" to the operator input. This increases the flexibility of the system in that the car wash operator can walk around the car wash and yet program in the requests by car owners into the system. The system further includes an input/output optical isolator unit 520 and relays 522.

FIG. 6 substantially illustrates one embodiment of operator input 40 of FIG. 1. The input device in this embodiment includes keypad 610, display means (LED) 612, input/output device (I/O) 614, microprocessor 616 and memory (MEM) 618. The I/O device 614 communicates over, for example, a communications network to an RS 422 port in I/O 14 connected to CPU 10. The RS 422 communications regime utilizes two transmission lines, at up to 56,000 baud over a distance exceeding one kilometer. The microprocessor 616 monitors the keypad 610 and translates and buffers its output. In operation, the car wash operator selects the appropriate keys, i.e., inputs, on keypad 610; the microprocessor translates the input based upon programs in memory 618 and transmits the properly configured data to CPU 10. After recording the inputs, the CPU then returns a signal to microprocessor 616 that confirms the data earlier sent by the input device. The microprocessor then displays the recorded and logged data on LED 612 so the operator can verify that CPU 10 received the correct information.

An additional feature can be added to the program run by CPU 10. Before any device is actuated, the car owner may mark a ticket with his/her selections. The ticket is a two-part ticket, one part being given to the car wash operator in charge of actuating input device 40, the other part being brought by the car owner to the cashier for payment for the service. The operator would input the ticket number as well as the owner's selections into the input device. This information would then be logged into CPU 10. Accordingly, when the owner presents the ticket to the cashier, the cashier inputs the ticket number and the exact inputs selected by the car wash operator appear on the cashier's display screen. The system thus provides a further check that the services provided at the car wash correspond to what is actually paid for by the customers, i.e., the car owners.

In this embodiment, CPU 10 may be interrupt driven rather than using a "swept port" method of operation.

An important feature of the present invention is that it utilizes a mass produced personal computer identified herein as a "multi-purpose" computer. This data retrieval and command producing system is not a dedicated car wash computer as is utilized in many prior art devices. The personal computer can generate numerous, custom-made reports based upon management programs that are loaded into the memory of the computer. The personal computer also provides a great degree of flexibility for the input/output ports. The computer can also be configured for other consumer services, such as sales at a gas station, and further management reports based on these services can be generated. The inputs regarding gas and oil sales can be input while the computer is controlling the car wash line. The ability of a personal computer to be coupled directly to a cash register is known to persons of ordinary skill in the art. The cash register tie-in eliminates mismatches or errors in sales or services. It also eliminates customer's not paying for the car wash services and tracks those customers. A further sub-routine can be added to the system which will note the specific time of day when the car length violation occurs and the duration of the violation. Therefore, the car wash owner can pinpoint the particular group of employees present on site during that violation. The computer provides a higher degree of flexibility for controlling the overall car wash line. It provides instant management information regarding the car wash operation on the video terminal that is updated as each car passes through the car wash line. This information includes sales per car, sales per car during the present hour, cars per man-hours, cars per man hour for the present hour, and additional management data. The computer can also act as a time clock recording when an employee arrives at work, leaves work, and his/her daily, weekly or bi-weekly wages. The computer enables off site management of the car wash if it includes a telecommunications input/output device such as a modem. This management data can be placed in a coded or a secure file such that car wash operators, i.e., non-management employees, cannot access this information without the proper codes. Accordingly, the present invention provides better anti-theft methods. The present system also records all start and stop times for the car wash line. The override clock counters on the manual switches eliminate theft by employees simply actuating the override switches. Trouble shooting of the present invention is made easy by step-by-step diagnostics and the presence of indicator lights on the I/O interfaces.

Further enhancements to the system can be made without departing from the concepts presented herein. As discussed earlier with respect to FIG. 1, the relay devices 28 each include a manual switch SM and a counter. The system can be altered such that the switches provide digital outputs and the computer can poll the counter and the contents of the counter can be down loaded into the computer. This feature is shown in FIG. 5. This would, of course, require further communications abilities extending through optical isolators 26. Also, it may be possible to provide a telecommunications link between the car washing and waxing devices and the central computer, thereby avoiding the optical isolators and the relays. However, in any situation there must be some type of voltage generators that provide control voltages (normally 24 volts) to the car washing and waxing devices. These and other modifications are meant to be encompassed by the appended claims.

What is claimed is:

1. A computerized car wash having a plurality of washing and waxing devices for cars controllable by command signals, the computerized car wash comprising:

means for tracking positions of said cars as they move by said plurality of devices in said car wash;
   an operator controlled input means for selecting select ones of said plurality of devices per car;
   means for generating and applying said command signals to said plurality of devices based upon (1) said select ones identified by said input means, (2) a pre-established, baseline operational sequence for said plurality of devices and (3) said positions of said cars determined by said tracking means; and,
   means for monitoring said tracking means and said input means and for determining the number of times and the duration when more than a single car has been tracked by said tracking means per selection by said input means.

2. A computerized car wash as claimed in claim 1 including an interface means for electrically isolating said devices from said means for generating said command signals, said interface means including a distinct override switch means for each said device which generates an override command signal.

3. A computerized car wash as claimed in claim 1 including means for recording the number of times said select ones of said devices were selected and recording said number of times and said duration when more than a single car has been tracked per selection.

4. A computerized car wash having a plurality of washing and waxing devices for cars being moved therethrough by a conveyor, said devices controlled by command signals, the computerized car wash comprising:

a car sensor means for determining the presence of a car on said conveyor;
   means for determining the movement of said conveyor;
   means for tracking positions of said cars as they move by said plurality of devices in said car wash based upon said car sensor means and said conveyor movement means;
   an operator controlled input means for selecting select ones of said plurality of devices per car;
   means for generating and applying said command signals to said plurality of devices based upon (1) said select ones identified by said input means, (2) a pre-established, baseline operational sequence for said plurality of devices and (3) said positions of said cars determined by said tracking means; and,
   means for monitoring said tracking means and said input means and determining the number of times and the duration when more than a single car has passed said car sensor means per selection of said select ones by said input means.

5. A computerized car wash as claimed in claim 4 wherein:

said car sensor means includes a car sensor disposed proximate the beginning of said conveyor and means for generating a car present signal;
   said conveyor movement means includes a conveyor sensor and means for generating movement signals corresponding to the movement of said conveyor;
   said input means including means for generating select signals;
   each of said means for tracking, means for generating said command signals and means for monitoring includes a computer having a processor and a memory;
   said computer having means for obtaining said car present signal and said movement signals and said select signals;
   said memory having stored therein said pre-established, baseline sequence; and
   said processor generating said command signals based upon said car present signals, said movement signals, said select signals and said baseline sequence.

6. A computerized car wash as claimed in claim 5 wherein said means for monitoring, as part of said computer, includes means for determining when the care present signal is ACTIVE for more than a predetermined number of movement signals thereby indicating that more than a single car has passed said car sensor means per selection of said select ones by said input means.

7. A computerized car wash having a plurality of washing and waxing devices for cars moving therethrough on a conveyor, said devices controlled by command signals, the computerized car wash comprising:

a car sensor means for determining the presence of a car on said conveyor;
   means for determining the movement of said conveyor;
   means for tracking positions of said cars as they move by said plurality of devices in said car wash based upon said car sensor means and said conveyor movement means;
   an operator controlled input means for selecting select ones of said plurality of devices per car;
   means for generating said command signals for said plurality of devices based upon (1) said select ones identified by said input means (2) a pre-established, baseline operational sequence for said plurality of devices and (3) said positions of said cars determined by said tracking means;
   means for electrically isolating and conditioning said command signals between said means for generating and said devices and for applying the resulting command signals to said devices;
   means for generating override command signals and applying the same to said devices, said override signal generator means including means for indicating the number of times said override command signals have been generated; and,
   means for monitoring said tracking means and said input means and determining when more than a single car has passed said car sensor means per selection of said select ones by said input means.

8. A controller for a car wash wherein the car wash has a plurality of washing and waxing devices for cars moving therethrough on a conveyor, said devices controllable by command signals, the controller comprising:
- a multi-purpose computer having a processor and a memory, said memory storing operation sequences for activating said devices;
- means for sensing the presence of a car on said conveyor;
- means for sensing the movement of said conveyor;
- an operator controlled input means for selecting select ones of said plurality of devices per car;
- an input/output interface interposed between said computer and each of said input means, said conveyor sensor means, said car sensor means, and said devices, said interface generating conditioned command signals for said devices based upon digitally formatted output signals from said computer, and said interface converting input signals from each of said input means, said conveyor sensor means and said car sensor means into digitally formatted input signals; and
- said computer including means for generating digital output signals based upon said digital input signals and said operational sequences and for outputting said digital output signals to said interface means thereby controlling said devices.

9. A controller as claimed in claim 8 wherein said computer includes means for determining the number of times and the duration when more than a single car has passed said car sensor means per selection of select ones at said input means based upon said digital input signals.

10. A controller as claimed in claim 9 wherein said means for determining compares the movement of said conveyor from said conveyor sensor means and the duration of an ACTIVE car presence signal from said car sensor means to a predetermined maximum car length value.

11. A controller as claimed in claim 10 wherein said means for determining generates a violation length signal, that is the duration, based upon the movement of said conveyor and the duration of said ACTIVE presence signal and generates a violation count, that is the number of times, each time said means for determining newly determines that more than a single car has passed per selection by said input means.

12. A controller as claimed in claim 11 including means for displaying said violation length and violation count.

13. A controller as claimed in claim 8 wherein said interface associated with said devices includes manually operable override switch means for generating override command signals for said devices.

14. A controller as claimed in claim 13 wherein said interface includes means for storing an indication of how long a period said manual switch means is activated.

15. A controller as claimed in claim 14 wherein said means for storing are non-resetable.

16. A controller as claimed in claim 8 wherein said computer includes means for computing car wash operating data based upon said digital input signals originating from said input means, said computing means storing said data in said memory.

17. A controller as claimed in claim 16 wherein said computing means monitors the actuation of said devices via said digital output signals and stores operating data relative thereto into said memory.

18. A controller as claimed in claim 17 wherein said computer includes an output means for visually and concurrently presenting said operating data to said operator.

19. A controller as claimed in claim 18 wherein said computer includes means for securely storing said operating data into said memory when power is removed from said computer, said means for securely storing permitting only the reading of said operational data after storage thereof in said memory.

20. A controller as claimed in claim 16 wherein said car wash operating data is formatted into management reports.

* * * * *